Aug. 8, 1950   F. M. BRAWAND   2,518,276
BUTT HOOK

Filed Sept. 6, 1947   2 Sheets-Sheet 1

INVENTOR.
Franklin M. Brawand
BY
Attorney

Aug. 8, 1950     F. M. BRAWAND     2,518,276
BUTT HOOK
Filed Sept. 6, 1947     2 Sheets-Sheet 2
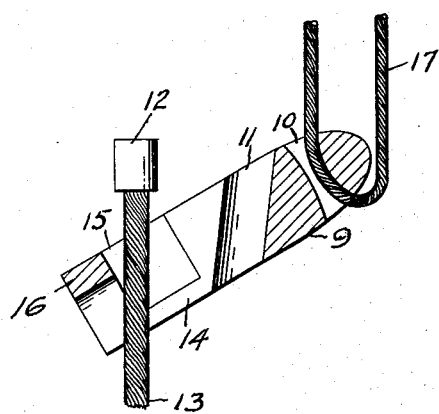
Fig. 4
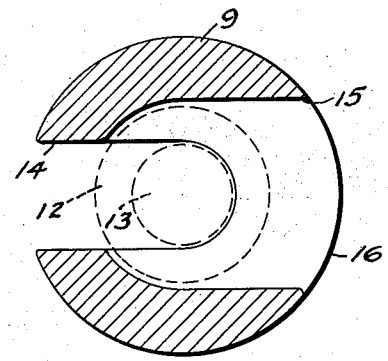
Fig. 3
Fig. 5
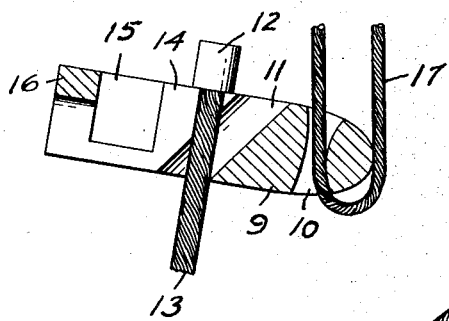
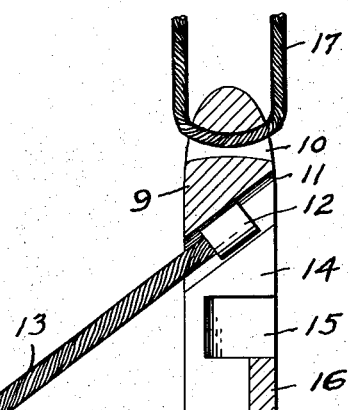
Fig. 6
*INVENTOR.*
Franklin M. Brawand
BY
*Attorney*

Patented Aug. 8, 1950

2,518,276

UNITED STATES PATENT OFFICE 2,518,276

BUTT HOOK

Franklin M. Brawand, Metzger, Oreg.

Application September 6, 1947, Serial No. 772,571

5 Claims. (Cl. 294—74)

My present invention relates to a butt hook for high line logging or similar operations, the invention having for its principal object the provision of means whereby a choker cable, or the like, employed for attaching logs to a high line, or other heavy loads to overhead conveying systems, may be attached without difficulty and yet will be so attached as to remain in engagement regardless of the extent to which angular displacement of the butt hook and choker cable may occur.

In high line logging a cable, called the high line, is attached to a mast or topped tree at one end and is anchored in the forest at its other end, and is provided with a trolley or similar device from which a butt hook is suspended, the trolley being movable along the cable by a portable engine of some sort. A choker cable, usually formed of woven steel wire, and provided with a plug or enlargement at one end thereof, is detachably secured to the butt hook by slipping the plug into a socket or the like in the butt hook. The logger affixes the depending end of the choker cable to a log to be removed from the forest and slips the plug into the butt hook, whereupon the engineman may move the trolley along the high line to bring the log to a truck or train loading point. After removing the log from the choker cable the trolley is sent back to the far end of the high line with the choker cable depending therefrom. In logging terrain there might be a number of ridges and ravines covered with living and fallen trees between the mast and the far end of the high line, so that the log being conveyed, or the choker cable on the return trip, often engages obstacles and causes the butt hook and trolley to assume practically all positions of angularity with respect to each other and to the axis of the high line, with the result that inefficient butt hooks may permit the disassociation of the choker cable plug with resulting danger to workmen and equipment due to falling logs, or on the return trip the choker cable may be dropped with possible danger, possible loss of the cable, and at least resulting delay while the cable is retrieved.

An object of the present invention therefore is to provide a butt hook which cannot become disassociated from the choker cable regardless of the relative displacement of the two members.

A further feature of high line logging is that the point on the terrain at which a choker cable is to be associated with the butt hook may not always be selected, with the result that the butt hook may be high overhead in an awkward position to reach. The ordinarily employed choker cable is of such semi-rigidity that the end thereof may be projected overhead to a considerable extent, and it is an object of the present invention to provide a butt hook of such configuration that a choker cable may be associated therewith when the butt hook is high overhead and within range of the projecting end of a choker cable manipulated by a workman standing on the ground.

The foregoing and other advantages of the present invention will be more readily apparent from an inspection of the accompanying drawings taken in connection with the following specification, wherein like numerals refer to like parts throughout, while the features of novelty will be more particularly pointed out in the appended claims.

In the drawings Fig. 1 is a front view of a butt hook of the present invention;

Fig. 3 is a horizontal section taken along line 3—3 of Fig. 2;

Fig. 4 is a sectional view on a reduced scale showing the extent to which the butt hook and choker cable may become partially disassociated without permitting total separation;

Fig. 5 is a view similar to Fig. 4 showing the functioning of the butt hook at a different position; and Fig. 6 is a similar view showing the method of attaching the choker cable to an overhead butt hook.

Figures 1, 2:
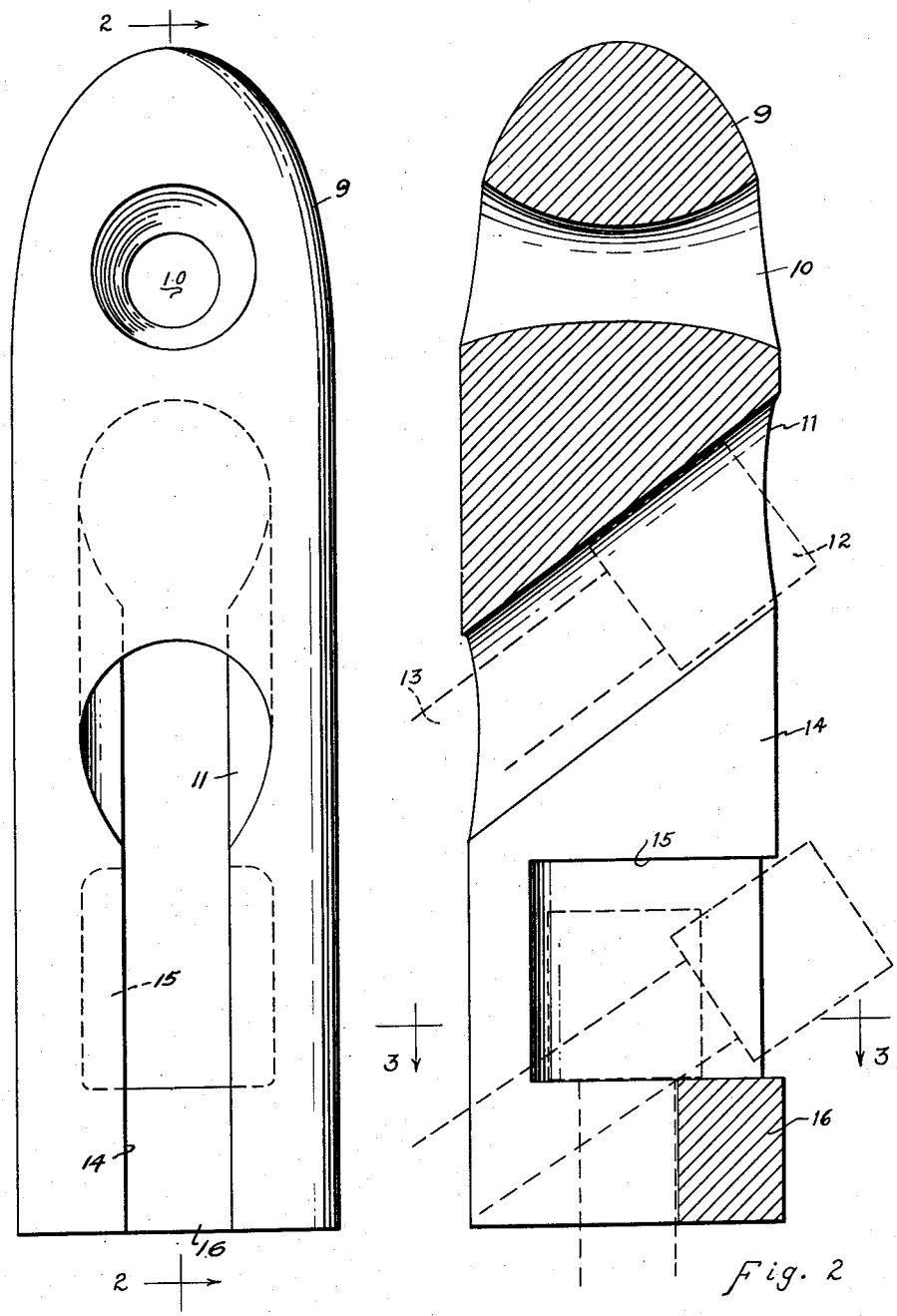
Fig. 2 is a vertical section taken along line 2—2 of Fig. 1.

Referring to Figs. 1, 2 and 3 it is seen that the butt hook of the present invention comprises preferably a substantially cylindrical member 9 having a rounded upper end, the views being about half actual size. Adjacent the upper end of the elongated member there is a transverse opening 10, preferably of rounded contour so as to avoid sharp corners which might tend to cut a suspending cable such as shown in Figs. 4 to 6 inclusive, the cable 17 being attached to a carriage or trolley on a high line (not shown). Other means of attaching the elongated member to the trolley may be provided. Member 9 is provided with a longitudinal slot 14 extending therethrough from side to side, the slot extending from adjacent the bottom end of the member toward the top thereof and terminating in an enlargement 11 extending entirely through the member at an inclination to the longitudinal axis thereof, preferably of about 45 degrees. The slot opens into a lower, second enlargement in the form of a cavity 15 extending partially through said member from the surface thereof beneath the upper end of the enlargement 11 to a point beyond the longitudinal axis of the member. The slot also is provided with an extension extending partially through the bottom of the member from the surface thereof beneath the lower end of the first enlargement 11 to a point beyond the longitudinal axis of the member, there being thus provided a bridge 16 across the slot 14 beneath the entrance to the cavity or socket 15.

As seen in Fig. 6, the ordinary choker cable 13, which is provided with a cylindrical plug 12 at its upper end, may be attached to the butt hook by sliding the plug 12 upward through the first enlargement 11 until the plug extends beyond the butt hook, whereupon the weight of the choker cable will cause it to drop until it contacts the bridge 16. The cable and its attached log may now be started on its way so that when the end of the cable or the attached log is free of the ground the plug will enter the cavity 15 with the cable depending substantially in line with the longitudinal axis of the butt hook. As seen in Fig. 4, the motion of the carriage, or the displacement of the cable caused by the cable or its attached log striking an obstruction, may cause the butt hook to swing in almost any direction. If the butt hook should swing upward so as to have the opening to the cavity 15 uppermost the choker plug 12 may leave the cavity, but the cable and butt hook cannot become separated due to the bridge 16 and the solid portion of the butt hook between the enlargement 11 and the attaching opening 10. If such swinging movement should continue to the extent that the bottom end is above the attaching end of the butt hook, as seen in Fig. 5, the cable 13 may slide downward until it strikes the solid portion beyond the lower end of the enlargement 11. In fact, the only way that disassociation of the butt hook and choker cable can be achieved is by intelligent manipulation of the choker cable to reverse the movements required to cause the cable plug to enter the socket 15 in the first instance.

Having illustrated and described a preferred embodiment of the present invention it should be apparent that modifications in detail and arrangement thereof are permissible, and that the employment thereof in other fields than logging, such as in ship loading or mining and the like, will be readily apparent to those skilled in the arts pertaining thereto. All such modifications and uses as come within the true spirit and scope of the appended claims are considered to be a part of my invention.

I claim:

1. A butt hook for high-line logging or similar operations comprising an elongated member adapted to be suspended from one end, said member having a slot extending therethrough from adjacent the bottom end thereof toward the top end thereof, said slot having a first enlargement at its upper terminus extending entirely through said member at an inclination to the longitudinal axis thereof, a second enlargement extending partially through said member from the longitudinal surface thereof beneath the upper end of said first enlargement horizontally inward to a point beyond the longitudinal axis of said member, and an extension extending partially through the bottom of said member from the longitudinal surface thereof beneath the lower end of said first enlargement to a point beyond the longitudinal axis of said member.

2. A butt hook for releasably securing a choker cable having a choker cable plug thereon as employed in high-line logging or similar operations comprising an elongated member adapted to be suspended from one end, said member having a slot extending therethrough from adjacent the bottom end thereof toward the top end thereof, said slot having a first enlargement at its upper terminus entirely through said member at an inclination to the longitudinal axis thereof, a second enlargement extending partially through said member from the side thereof beneath the upper end of said first enlargement horizontally inward to a point beyond the longitudinal axis of said member, and an extension through the bottom of said member from the side thereof beneath the lower end of said first enlargement to a point beyond the longitudinal axis of said member, said slot being of such width as to permit passage therethrough of the normally used choker cable but not of the choker cable plug, and said enlargements being of such width as to be capable of permitting passage of the choker cable plug.

3. A butt hook comprising an elongated member having a passage therethrough at an inclination to the longitudinal axis thereof, a socket extending inwardly from the side thereof beneath the upper end of said passage, and a slot, narrower than said passage or said socket, extending through said member between the lower surface of said passage and the upper wall of said socket, between the surface of said member below the lower end of said passage and the inner end of said socket, and between the lower end of said member and the lower wall of said socket except the portion below the entrance to said socket.

4. A butt hook comprising an elongated member having a passage therethrough at an inclination to the longitudinal axis thereof, a socket extending inwardly from the side thereof beneath the upper end of said passage, and a slot, narrower than said passage or said socket, extending through said member between the lower surface of said passage and the upper wall of said socket, between the surface of said member below the lower end of said passage and the inner end of said socket, and between the lower end of said member and the lower wall of said socket to a point between the longitudinal axis of said member and the entrance to said socket.

5. A butt hook for detachably mounting a choker cable having a choker cable plug thereon comprising an elongated member having a passage therethrough at an inclination to the longitudinal axis thereof, a socket extending inwardly from the side thereof beneath the upper end of said passage, a slot, narrower than said passage or said socket, extending through said member between the lower surface of said passage and the upper wall of said socket, between the surface of said member below the lower end of said passage and the inner end of said socket, and between the lower end of said member and the lower wall of said socket, and a substantial bridge across said slot below the entrance to said socket, said slot being of a width to permit passage therethrough of the normally used choker cable but not of the choker cable plug, said passage being of such diameter as to permit passage therethrough of the choker cable plug when inserted with its axis aligned with the axis of the passage, and said socket being of such size as to permit reception of the choker cable plug with its axis parallel to the axis of said member.

FRANKLIN M. BRAWAND.

REFERENCES CITED

The following references are of record in the file of this patent:

UNITED STATES PATENTS

| Number | Name | Date |
| --- | --- | --- |
| 1,764,135 | Young | June 17, 1930 |